United States Patent [19]
Breezer et al.

[11] Patent Number: 5,885,691
[45] Date of Patent: *Mar. 23, 1999

[54] SELECTIVELY REINFORCED THERMOFORMED ARTICLE AND PROCESS

[75] Inventors: Harlon W. Breezer; William F. Price, both of Portage, Wis.

[73] Assignee: TriEnda Corporation, Portage, Wis.

[*] Notice: The term of this patent shall not extend beyond the expiration date of Pat. No. 5,046,434.

[21] Appl. No.: 702,360

[22] Filed: Aug. 23, 1996

Related U.S. Application Data

[63] Continuation of Ser. No. 272,128, Jul. 8, 1994, abandoned, which is a continuation of Ser. No. 518,011, May 2, 1990, abandoned.

[51] Int. Cl.$^6$ ............................ B32B 3/00; B32B 31/06
[52] U.S. Cl. ..................... 428/156; 428/159; 428/161; 428/162; 428/172; 428/78; 428/189; 428/77; 428/68; 428/76; 428/174; 428/213; 428/166; 428/178; 108/51.1; 108/901; 108/902; 425/588; 425/504; 425/327; 264/328.1; 264/DIG. 50; 264/255; 264/261
[58] Field of Search ...................... 428/156, 159, 428/161, 162, 172, 78, 189, 77, 68, 76, 174, 213, 166, 178; 108/51.1, 901, 902; 425/588, 504, 327; 264/328.1, DIG. 50, 255, 261, 268

[56] References Cited

U.S. PATENT DOCUMENTS

| | | | |
|---|---|---|---|
| 1,342,664 | 6/1920 | Charles | 428/598 |
| 2,796,634 | 6/1957 | Chellis | 18/56 |
| 2,797,179 | 6/1957 | Reynolds et al. | 154/110 |
| 3,112,715 | 12/1963 | Callahan et al. | 108/52 |
| 3,164,110 | 1/1965 | Bofinger | 108/161 |
| 3,242,245 | 3/1966 | Greig et al. | 264/89 |
| 3,281,301 | 10/1966 | Bolesky | 156/221 |
| 3,330,228 | 7/1967 | Donnelly | 108/51 |
| 3,462,330 | 8/1969 | Greig et al. | 156/197 |
| 3,467,032 | 9/1969 | Rowlands et al. | 108/51 |
| 3,628,468 | 12/1971 | Angelbeck, Jr. | 108/53 |
| 3,630,157 | 12/1971 | Ortenblad | 108/53 |
| 3,640,229 | 2/1972 | Bell | 108/58 |
| 3,680,496 | 8/1972 | Westlake, Jr. | 108/58 |
| 3,687,764 | 8/1972 | Rogosch et al. | 156/179 |
| 3,699,902 | 10/1972 | Allgeyer et al. | 108/58 |
| 3,702,100 | 11/1972 | Wharton | 108/58 |
| 3,717,922 | 2/1973 | Witkowski | 29/421 |
| 3,737,496 | 6/1973 | Voorhees, Sr. | 264/511 |
| 3,817,806 | 6/1974 | Anderson et al. | 156/161 |

(List continued on next page.)

FOREIGN PATENT DOCUMENTS

| | | |
|---|---|---|
| 168956 | 4/1985 | Japan . |
| 043265 | 9/1987 | Japan . |
| 295210 | 7/1991 | Japan . |

*Primary Examiner*—William P. Watkins, III
*Attorney, Agent, or Firm*—Lathrop & Clark LLP

[57] ABSTRACT

A process is disclosed for producing reinforced twin-sheet thermoformed articles comprising the steps of heating first and second sheets of thermoplastic material; forming the sheets in molds; heating a reinforcing insert of thermoplastic material; placing the heated insert on the first sheet in its mold at the location to be reinforced; pressing the second sheet into contact with the heated first sheet and the heated insert to form the insert between the sheets so that a fusion of the thermoplastic sheets and the insert takes place to produce a reinforced section of the article having a desired shape and thickness. Alternative processes are disclosed wherein a heated quantity of thermoplastic liquid material is extruded or injected between the first and second sheets within the first and second molds either by inserting the liquid material before the molds are closed or by injecting it through one of the molds. Also disclosed are twin-sheet thermoformed articles with reinforced sections which are thicker than the combined thicknesses of the two thermoformed sheets at a particular location. The articles may advantageously be reinforced with plastic identical to the plastic of the two sheets. The articles are also easily recycled as they are entirely plastic with no non-plastic matter included.

7 Claims, 4 Drawing Sheets

U.S. PATENT DOCUMENTS

| | | | |
|---|---|---|---|
| 3,832,955 | 9/1974 | Pottinger et al. | 108/51 |
| 3,867,088 | 2/1975 | Brown et al. | 425/504 |
| 3,911,514 | 10/1975 | Ito | 9/8 R |
| 3,935,358 | 1/1976 | Wyeth et al. | 428/166 |
| 3,954,923 | 5/1976 | Valyi | 264/94 |
| 4,118,261 | 10/1978 | Pedler | 156/145 |
| 4,131,702 | 12/1978 | Alfter et al. | 428/76 |
| 4,157,415 | 6/1979 | Lindenberg | 428/284 |
| 4,175,315 | 11/1979 | Hayes, Sr. et al. | 29/453 |
| 4,192,701 | 3/1980 | Martin et al. | 156/285 |
| 4,200,481 | 4/1980 | Faller | 156/382 |
| 4,246,734 | 1/1981 | Fogle, Jr. et al. | 52/309.16 |
| 4,248,163 | 2/1981 | Caughey | 108/53.3 |
| 4,267,223 | 5/1981 | Swartz | 428/172 |
| 4,423,000 | 12/1983 | Teraoka | 264/524 |
| 4,428,306 | 1/1984 | Dresen et al. | 108/53.3 |
| 4,490,884 | 1/1985 | Vickers | 16/338 |
| 4,507,348 | 3/1985 | Nagata et al. | 428/172 |
| 4,544,588 | 10/1985 | Schauf | 428/35 |
| 4,545,090 | 10/1985 | Redmond | 16/385 |
| 4,572,856 | 2/1986 | Gembinski | 428/71 |
| 4,608,104 | 8/1986 | Holtrop et al. | 156/78 |
| 4,637,909 | 1/1987 | Lucca | 264/510 |
| 4,788,088 | 11/1988 | Kohl | 428/34.5 |
| 4,790,972 | 12/1988 | Coffman | 264/152 |
| 4,873,041 | 10/1989 | Masui et al. | 264/135 |
| 4,873,045 | 10/1989 | Fujita et al. | 264/259 |
| 4,879,956 | 11/1989 | Shuert | 108/53.3 |
| 4,906,510 | 3/1990 | Todor, Jr. et al. | 428/182 |
| 4,999,068 | 3/1991 | Chiarella | 156/78 |
| 5,046,434 | 9/1991 | Breezer et al. | 108/51.1 |
| 5,050,341 | 9/1991 | Breezer et al. | 47/59 |
| 5,108,529 | 4/1992 | Shuert | 156/214 |
| 5,223,201 | 6/1993 | Masui et al. | 264/163 |
| 5,238,640 | 8/1993 | Masui et al. | 264/266 |
| 5,283,028 | 2/1994 | Breezer et al. | 264/511 |

SELECTIVELY REINFORCED THERMOFORMED ARTICLE AND PROCESS

This is a continuation of application Ser. No. 08/272,128, filed Jul. 8, 1994, now abandoned, which was a continuation of application Ser. No. 07/518,011 filed May 2, 1990 abandoned.

FIELD OF THE INVENTION

The present invention relates to twin-sheet thermoformed plastic articles and processes for making such articles in general, and to selectively reinforced articles and twin-sheet thermoforming processes for making such reinforced articles in particular.

BACKGROUND OF THE INVENTION

The thermoforming process may be used to form plastic articles of all sizes, and is particularly effective when it is desired to form large plastic articles at low cost. Articles thermoformed from a single sheet of thermoplastic material are generally limited in wall thickness to the thickness of the sheet or less, throughout. By utilizing a twin-sheet thermoforming process articles of greater thickness and stiffness may be formed. The overall thickness of an article formed from twin-sheets may be varied by providing a separation between the thermoformed sheets. However, solid portions of the article are limited to the combined thicknesses of the two fused sheets from which the article is formed. Also, portions of the article which are formed more deeply in the mold will tend to be thinner than the full combined thicknesses of the sheets from which the article is formed, because the sheets must be drawn and stretched, with corresponding thinning, to form such portions.

Thus, although it is possible to form large and very stiff articles using the twin-sheet thermoforming process, the strength of the articles is limited to the strength obtained by fusing the two sheets in various configurations. Generally, if it is desired or necessary to increase the strength of a portion of a formed twin-sheet article, it is necessary to increase the thickness of one or both of the entire sheets, which results in higher overall cost of material. A need exists for a twin-sheet thermoformed article having reinforced portions which would stand up to greater wear or abrasion conditions, or facilitate efficient connection of such articles.

It has been common practice to reinforce plastic twin-sheet thermoformed articles with metal, wood, or other reinforcing material. These reinforcements may be costly and detract from the advantageous properties of an all-plastic article, such as low density, fire resistance, and weatherability. Also, the addition of non-plastic reinforcements makes eventual recycling of the article difficult as the non-plastic portions must be separated from the plastic before the plastic may be used again.

Methods for producing uniformly reinforced plastic sheet material wherein reinforcing strands or webs are positioned between bonded sheets are well known. A uniformly reinforced plastic sheet, however, results in an unnecessary increase in the overall weight and material usage of the finished article. A process has also been developed for selectively reinforcing portions of a single-sheet thermoformed article involving the application of powdered plastic to the sheet of thermoplastic material prior to drawing the sheet in the vacuum mold. This process requires complicated forms for retaining the reinforcing plastic on the plastic sheet during the heating step, and does not appear well adapted for twin-sheet thermoforming. Reinforcements employing plastic foams are also known, but articles formed of different types of plastic are also difficult to recycle.

An improved thermoformed article and thermoforming process are needed which retain advantages and efficiencies of twin-sheet thermoforming yet allow localized increases in thickness of the finished article.

BRIEF DESCRIPTION OF THE INVENTION

The first step in the process for producing a reinforced article of this invention is to heat first and second sheets of thermoplastic material. The heated sheets are then formed in first and second molds. A reinforcing insert of thermoplastic material is heated and placed on the first sheet in the mold at the location to be reinforced. The heated second sheet in the second mold is pressed into contact with the heated first sheet and the heated insert within the first mold so that a fusion of the thermoplastic sheets and the insert takes place to produce an article having a reinforced section of greater thickness than the combined thicknesses of the first and second sheets at the section location.

The process may alternatively include the steps of extruding a quantity of heated liquid thermoplastic material onto the first sheet in the mold in the area or areas of the article to be reinforced, or injecting a quantity of heated thermoplastic material onto the first sheet through a fitting in the first mold or forming a hollow cavity between the first and second sheets and injecting a liquid thermoplastic material through one of the molds into the cavity.

It is an object of this invention to provide twin-sheet thermoformed plastic articles having reinforced areas of greater thickness than the combined thicknesses at the location of the reinforcement of the sheets from which the article is formed.

It is a further object of this invention to provide a process for producing twin-sheet thermoformed articles with portions of significantly greater thickness than the combined thicknesses, at a particular location, of the sheets from which the article is formed.

It is a still further object of this invention to provide a process for thermoforming articles with reinforced sections of varying thickness.

It is also an object of this invention to provide a process for forming thermoformed articles with reinforced depressions and protrusions.

It is another object of this invention to provide a process for forming reinforced twin sheet thermoformed articles from a common thermoplastic material to facilitate recycling.

Further objects, features, and advantages of the invention will be apparent from the following detailed description when taken in conjunction with the accompanying drawings.

DESCRIPTION OF THE PREFERRED EMBODIMENT

Figure 1:
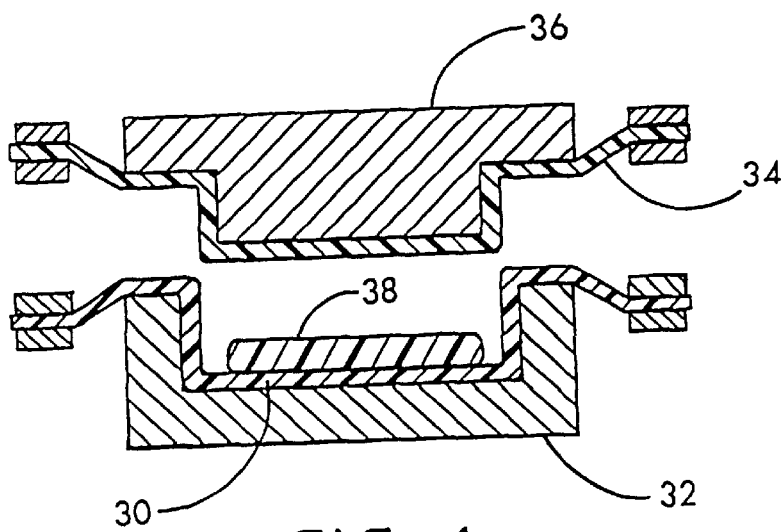
FIG. 1 is a schematic view in cross section of first and second heated thermoplastic sheets formed in first and second molds with the reinforcing thermoplastic insert of the invention placed on the first sheet within the first mold.

Referring now to FIGS. 1–9 wherein like numbers refer to similar parts, FIG. 1 shows a first sheet of thermoplastic material 30. The sheet 30 will typically be an extruded thermoplastic sheet formed of polypropylene, polystyrene, polyethylene, acrylic, PETG, XT or ABS, or any other appropriate thermoplastic or alloy blend of thermoplastics. The sheet will typically be from 0.0075 to 0.500 inches thick and can be as large as the thermoforming equipment allows and the thermoformed article requires, usually up to seven by twelve feet. The first sheet 30 is held along its edges and heated until it is in a malleable state. The malleable sheet 30 is then positioned over a first vacuum mold 32 which is a metallic one-piece mold with numerous passages (not shown) for air to be drawn from the interior of the mold.

When the first sheet 30 is placed over the first mold 32 the malleable plastic is drawn by vacuum down into the mold to conform to the contours of the inner surface of the mold as in the standard one-sheet thermoforming process. The first sheet 30 may be formed, as shown in FIG. 1, to have an upwardly opening cavity.

As in the standard twin-sheet thermoforming process a second thermoplastic sheet 34 is heated until malleable and drawn onto a second vacuum mold 36. The second sheet 34 may be formed, as shown in FIG. 1, to have downwardly extending portions which open upwardly. The downwardly extending portions thus overlie the upwardly opening cavity of the first sheet. In the standard process the second sheet in the second mold would be pressed down over the first sheet in the first mold to cause the first sheet to fuse with the second sheet at specified points or surfaces.

Figure 2:
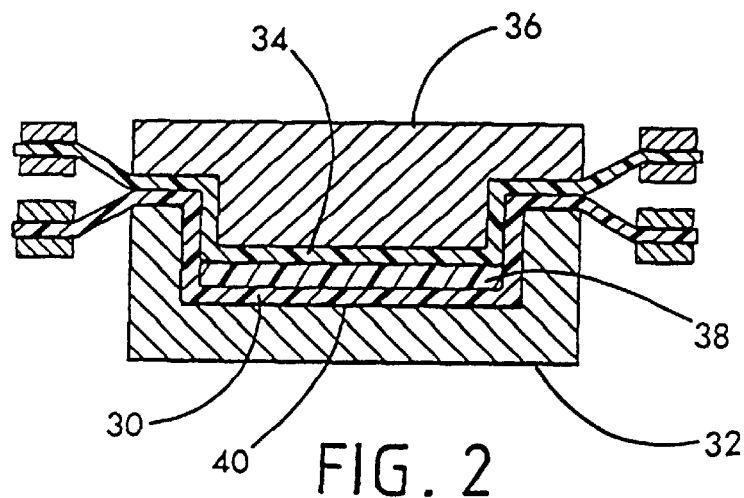
FIG. 2 is a schematic view in cross section showing the second sheet in the second mold of FIG. 1 pressed into contact with the first sheet and the heated insert in the first mold to form the reinforced twin-sheet thermoformed thermoplastic article of the invention.
Figure 3:
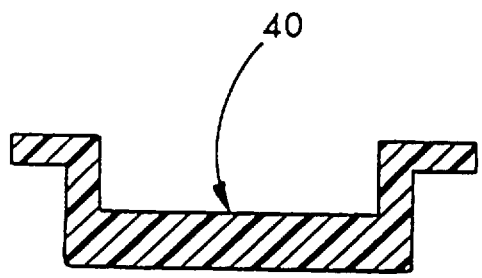
FIG. 3 is a cross-sectional view of the integral reinforced twin-sheet thermoformed thermoplastic article formed in FIG. 2.

In the process of this invention, however, a thermoplastic insert 38 is heated to a forming temperature in a preheat oven and positioned in the area to be reinforced on the first sheet 30 in the first vacuum mold 32 before the second sheet is fused with the first sheet as shown in FIG. 1. The insert 38 at forming temperature will be semi-solid and easily placed by a robotic arm or by manual means into position in the first sheet 30 within the first mold 32. The insert 38, prior to heating, is shaped and sized to fit within the molded article which is to be reinforced. The insert may be machined, molded, or otherwise processed to the appropriate dimensions. The insert 38 is heated in the preheat oven at close proximity to the location of the first and second molds 30, 36 so that it may be rapidly extracted from the preheat oven and placed in its correct position before the insert has time to cool and lose its malleability and formability. Once the sheets 30, 34, are drawn into the molds 32, 36, they will begin to cool and loose their malleability. The actual time for the sheets to lose their malleability will depend on the thermoplastic material, the temperature to which they have been heated, and the ambient temperature, but may be on the order of 20 seconds. Thus, before the sheets 30, 34, and the insert 38 cool significantly, the second sheet 34 is pressed down onto the first sheet 30 to place the insert 38 under continuous pressure as shown in FIG. 2. When the heated thermoplastic sheets are pressed into contact with one another a fusion of the thermoplastic material takes place producing an article 40 of continuous integral thermoplastic material. The insert 38, while still thermoplastic, is pressed between the first and second sheets 30, 34 and is fused to both sheets. The fused plastic is preferably cooled in the molds by liquid cooling of the molds. When the article 40 (shown in FIG. 3) is released from the molds 32, 36 the reinforced portion is an integral part of the plastic article.

The malleable insert 38, when subjected to pressure by the first and second sheets 30, 34 in the first and second molds 30, 36 is not only forced to fuse to the first and second sheets 30, 34 but is also formed to a desired shape, generally determined by the surfaces of the first and second sheets. In general, the insert 38 will fill the space between the two sheets to form an area of solid reinforced plastic.

Reinforcements may be desired at portions of the article which are drawn more deeply in the mold to overcome the general thinning of the plastic sheets that occurs as the plastic is distorted to cover a greater depth in the mold. Such reinforcement may particularly be desired at high wear points of the article, such as in pallet feet, as disclosed in the copending patent application directed to PLASTIC REINFORCED THERMOFORMED PALLET, now U.S. Pat. No. 5,046,434. Reinforcement may also be desired at portions of the article which must bear concentrated loads, such as hinge members, as disclosed in the copending patent application directed to a THERMOPLASTIC AQUATIC BIOMASS CONTAINMENT BARRIER WITH REINFORCED HINGE, now U.S. Pat. No. 5,050,341.

As in the conventional twin-sheet thermoforming process, the two sheets 30, 34 will generally be fused directly to one another at some non-reinforced locations.

Although any appropriate thermoplastic materials may be used for the inserts and the sheets, if eventual recycling of the plastic article is envisioned, the three elements of the article are advantageously formed of the same thermoplastic material. An article so formed may, at the end of its useful life, be conveniently and expeditiously ground up into uniform thermoplastic chips and recycled.

Figure 4:
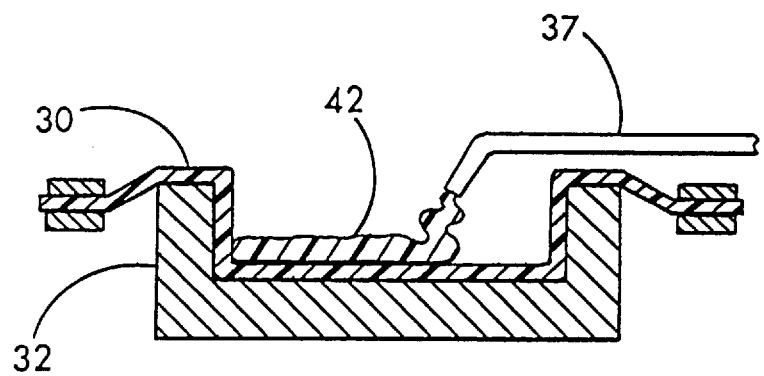
FIG. 4 is a schematic view in cross section of a quantity of thermoplastic material being extruded onto a first sheet of thermoplastic material in a mold according to an alternative embodiment of the process of the invention.

An alternative embodiment of the process of this invention is illustrated in FIG. 4. A first sheet 30 of thermoplastic material is heated and drawn into a vacuum mold. Once the first sheet has been molded and while it is still hot an injector 37 is positioned within the cavity to be reinforced and a quantity of heated thermoplastic material 42 is extruded into the cavity. Heated supply lines (not shown) bring hot liquid thermoplastic to the injector 37 which profiles the hot liquid through a die of the desired cross section. Once the hot thermoplastic has been extruded onto the first sheet, a second sheet which has been drawn onto a second vacuum mold is pressed down on the first sheet 30 in the first vacuum mold 32 and made to fuse with the first sheet 30 and the extruded quantity of thermoplastic material 42. The pressure of the sheets on the extruded quantity of thermoplastic material 42 will form the quantity to the desired shape and thickness required for the reinforcement.

The extrusion process is advantageously employed for reinforcing portions of the thermoformed article which have a consistent profile.

Figure 5:
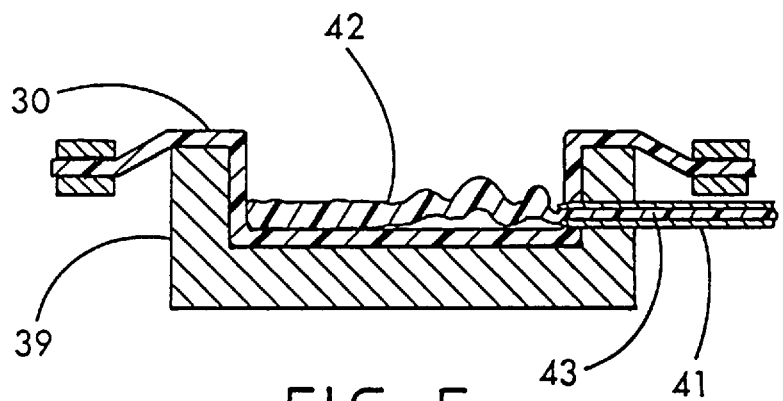
FIG. 5 is a schematic view in cross section of a quantity of thermoplastic material being injected onto a first sheet within a first mold through the wall of the first mold according to an alternative embodiment of the process of the invention.

Alternatively, as shown in FIG. 5, the quantity of liquid thermoplastic material 42 may be injected onto the first sheet 30 by an injector 41 introduced through a passage 43 in a first mold 39. The injector 41 pierces the maleable first sheet 30 within the first mold 39 and introduces a specified quantity of thermoplastic material 42. The injector is then withdrawn and a second sheet, which has been formed in a second mold, is pressed into contact with the first sheet 30 and the quantity of thermoplastic material 42 to form the quantity 42 and fuse the quantity and the sheets into a solid article.

Figure 6:
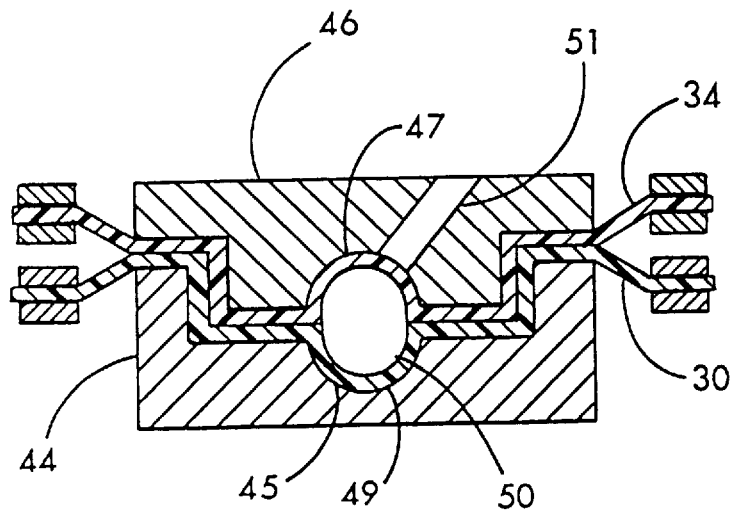
FIG. 6 is a schematic view in cross section of two thermoplastic sheets pressed into contact with one another by a pair of molds to form a shell defining a cavity between the two sheets as a preliminary step in an alternative embodiment of the process of the invention.
Figure 7:
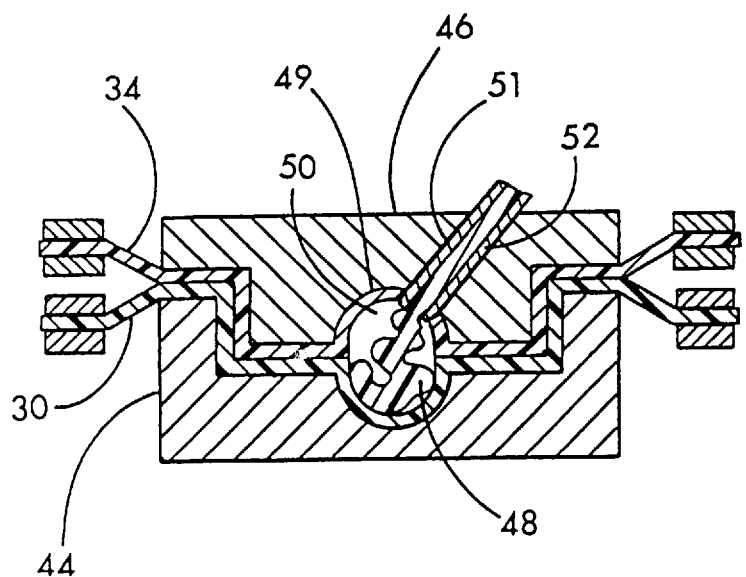
FIG. 7 is a schematic view in cross section of molten thermoplastic material being injected into the cavity formed between the two sheets of FIG. 6 through one of the molds according to the process of the invention.
Figure 8:
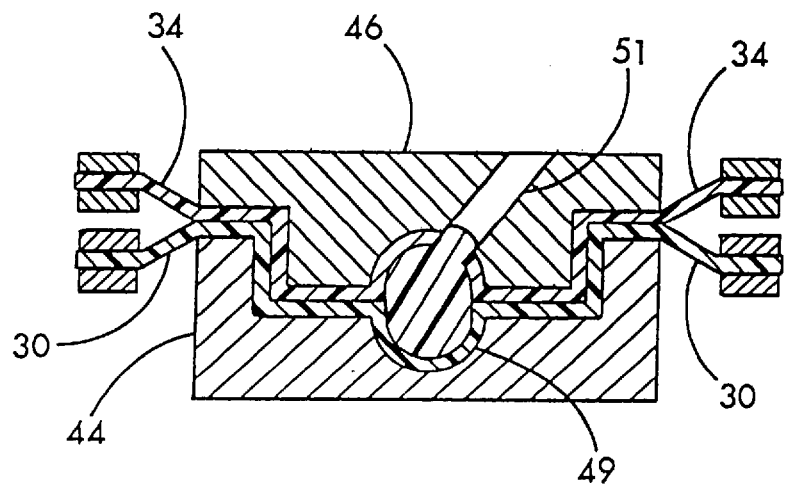
FIG. 8 is a schematic cross-sectional view of the reinforced twin-sheet thermoformed thermoplastic article formed within the molds of FIG. 6.
Figure 9:
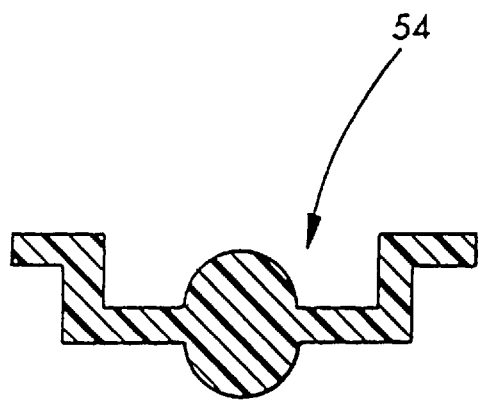
FIG. 9 is a cross-sectional view of the integral reinforced twin-sheet thermoformed thermoplastic article formed in FIG. 8.

In another embodiment of the process of this invention, illustrated in FIGS. 6–9, the first and second thermoplastic sheets 30, 34 are heated until malleable and then formed in first and second vacuum molds 44, 46 at substantially the same time. The two sheets are then forced together as shown in FIG. 6 and fused at the areas of contact. The first mold 44 molds a first portion of a shell 45 in the first sheet 30 which thus forms an upwardly opening cavity, and the second mold 46 molds a second portion of a shell 47 in the second sheet 34 having portions which open downwardly toward said cavity. When the first sheet 30 and the second sheet 34 are pressed together a continuous shell 49 is formed defining a hollow cavity 50. To achieve the reinforcement a quantity of heated liquid thermoplastic material 48 is injected under pressure into the cavity 50 between the first and second sheets by an injector 52 inserted through a passage 51 in either the first or second vacuum mold and through the sheet formed thereon. For illustrative purposes, the passage 51 is shown in the second mold 46. The quantity of liquid thermoplastic material 48 injected into the cavity 50 is sufficient to substantially fill the cavity 50 with thermoplastic material. The cavity 50 may be vented in a conventional manner to allow escape of air. Under applied pressure the liquid thermoplastic material 48 then fuses with the first sheet 30 and the second sheet 34 as shown in FIG. 8 to form an integral solid plastic article 54 as shown in FIG. 9. This process is most advantageously employed if the area of reinforcement extends above the surface of the first sheet, is of varying cross section, or other irregular shape.

It should be noted that the reinforced thermoforming process of this invention may be performed using well known twin-sheet thermoforming equipment. Articles formed by this process may have one or several reinforced portions. Although for purposes of recycling it is preferable that the reinforcing thermoplastic be the same as the thermoplastic of the first and second sheets, in some applications it may be advantageous to utilize a reinforcing thermoplastic material with different properties than the surrounding sheets.

It is to be understood that the invention is not confined to the particular construction and arrangement of parts herein illustrated and described but embraces such modified forms thereof as come within the scope of the following claims.

We claim:

1. A reinforced twin-sheet thermoformed thermoplastic article comprising:
   (a) a first thermoformed thermoplastic sheet;
   (b) a second thermoplastic sheet; and
   (c) a quantity of solid thermoplastic material located between and fused to the first and second thermoplastic sheets at a reinforced section of the article such that the reinforced section is of greater thickness than the combined thickness of the first and second sheets at the section location, and wherein the first thermoplastic sheet is fused to the second thermoplastic sheet without an intermediate sheet at locations other than at the reinforced section of the article.

2. The article of claim 1 wherein the first sheet, the second sheet, and the quantity of thermoplastic material are all formed of the same thermoplastic material.

3. A reinforced twin-sheet thermoformed thermoplastic article comprising:
   (a) a first thermoplastic sheet having at least a portion thereof thermoformed;
   (b) a second thermoplastic sheet having at least a portion thereof thermoformed, wherein the thermoformed portions of the first and second sheets define a cavity; and
   (c) a solid thermoplastic reinforcing insert molded to substantially the same shape as the cavity and fused to the thermoformed portions of the first and second sheets.

4. The article of claim 3 wherein the first sheet, the second sheet and the insert are all made of the same thermoplastic material.

5. The article of claim 3 wherein the first and second thermoplastic sheets are fused directly to one another in at least one location.

6. A reinforced twin-sheet thermoformed thermoplastic article comprising:
   (a) a first thermoformed thermoplastic sheet formed to have an upwardly opening cavity;
   (b) a second thermoformed thermoplastic sheet having downwardly extending portions which open upwardly, said downwardly extending portions overlying the upwardly opening cavity of the first sheet, wherein portions of the first sheet are fused directly to portions of the second sheet spaced from the cavity; and
   (c) a quantity of solid thermoplastic material disposed within the first thermoplastic sheet cavity and fused to both the first thermoplastic sheet and the second thermoplastic sheet and molded into the shape of the cavity by the first sheet and the second sheet.

7. A reinforced twin-sheet thermoformed thermoplastic article comprising:
   (a) a first thermoformed thermoplastic sheet formed to have an upwardly opening cavity;
   (b) a second thermoformed thermoplastic sheet having portions which open downwardly toward said cavity, said downwardly opening portions overlying the upwardly opening cavity of the first sheet, wherein portions of the first sheet are fused directly to portions of the second sheet spaced from the cavity; and
   (c) a quantity of solid thermoplastic material disposed within the cavity and fused to both the first thermoplastic sheet and the second thermoplastic sheet and molded into the shape of the cavity by the first sheet and the second sheet.

* * * * *